US005778052A

United States Patent [19]
Rubin et al.

[11] Patent Number: 5,778,052
[45] Date of Patent: Jul. 7, 1998

[54] METHOD AND SYSTEM FOR STORING MESSAGES FOR LATER FORWARDING

[75] Inventors: Robert Michael Rubin, Morristown; James Michael Rulon, Randolph, both of N.J.; Stephen Wise, New Hope, Pa.

[73] Assignee: AT&T Corp., Middletown, N.J.

[21] Appl. No.: 606,256

[22] Filed: Feb. 23, 1996

[51] Int. Cl.$^6$ .............................. H04M 1/64; H04M 3/50
[52] U.S. Cl. .............................. 379/89; 379/211; 379/230
[58] Field of Search ........................... 379/67, 88, 89, 379/229, 230, 201, 210, 211, 212, 213

[56] References Cited

U.S. PATENT DOCUMENTS

| | | | |
|---|---|---|---|
| 4,602,129 | 7/1986 | Matthews et al. | 379/67 |
| 4,625,081 | 11/1986 | Lotito et al. | 379/88 |
| 4,926,462 | 5/1990 | Ladd et al. | |
| 5,172,404 | 12/1992 | Hashimoto . | |
| 5,345,497 | 9/1994 | Amoroso et al. . | |
| 5,475,737 | 12/1995 | Garner et al. | 379/67 |
| 5,535,263 | 7/1996 | Blumhardt | 379/67 |
| 5,586,177 | 12/1996 | Farris et al. | 379/220 |

*Primary Examiner*—Fan S. Tsang

[57] ABSTRACT

Messages can be stored in a switched telephone network for later forwarding. A telephone call from a calling party telephone station being directed to a destination party telephone number is switched to a service switching point. The telephone call is monitored to determine a busy or unanswered condition at the destination party telephone number. A network database is queried to retrieve message recording instructions for the calling party. A message from the calling party is stored within the network database. The stored message is forwarded at a later date and time to one or more destination party telephone numbers. A destination party can access the message if authorized, and can record a comment onto the message. A destination party can forward the message and added comment back to the calling party or to one or more third parties.

13 Claims, 3 Drawing Sheets

METHOD AND SYSTEM FOR STORING MESSAGES FOR LATER FORWARDING

FIELD OF THE INVENTION

This invention relates to a method and system for storing caller initiated messages in a telephone network for later forwarding to a destination party.

BACKGROUND OF THE INVENTION

In the modern telephone age services such as call forwarding, call waiting, video transfer and other similar voice and data services are a desired way of doing business. Often, the destination party for a telephone call is busy and the calling party initiating a call desires to leave a message.

Some private branch exchanges have solved the problem by storing a message from a calling party for future transfer at a later date throughout the private branch exchange to another user of the exchange. Also, some telephones allow recording of messages at the premises with later automatic dialing and forwarding of the message to a destination party.

These solutions, however, require additional hardware and software at the premises location of the calling party or sophisticated technology and system software at the private branch exchange.

SUMMARY OF THE INVENTION

We have recognized that it would be desirable if (a) the telephone switching network supported broadcast messaging so that messages could be recorded in the telephone switching network and simultaneously transmitted to one or more persons, (b) additional comments could be added to messages stored in the network by the destination party and the messages subsequently forwarded with the additional comments to a calling party or third parties, (c) the telephone switching network allowed recording and forwarding of messages so that messages could be forwarded at a selected date and time, and (d) identification of a party receiving a message, such as by an entered personal identification number, were supported.

In accordance with the principles of the invention, a method and system for storing messages for later forwarding includes a switch for switching a telephone call initiated by a calling party and being routed to a destination party telephone number to a service switching point in a switched telephone network. The status of the telephone call is monitored to determine a busy or unanswered condition at the destination party telephone number. If the destination party telephone number is busy or unanswered, a message from the calling party can be recorded within the network database, which can be part of a service control point in the switched telephone network. The network database is queried to retrieve message recording instructions for the calling party. The message recording instructions prompt an announcement manager in the system to generate an announcement for the calling party to record a message. The recorded message can be forwarded to one or more telephone numbers corresponding to various destination parties at a later time according to a specified date and time received from the calling party. A translatable telephone number, such as an "800" toll-free number, can be dialed by the calling party, the one or more destination parties, or a third party to receive stored messages and, if necessary, modify stored messages. The capability to forward a message, with an added comment, to a third party is supported according to the principles of the invention.

In another illustrative embodiment, the ability to forward a message to a destination party is based on whether the destination party is a subscriber to the messaging system and is thus authorized to receive messages. The subscriber status of the destination party is verified responsive to an entered personal identification number. A database is accessed through appropriate queries to determine if a personal identification number entered by a system user is authorized.

BRIEF DESCRIPTION OF THE DRAWING

The foregoing and other objects and advantages of the present invention will be appreciated more fully from the following description, with reference to the accompanying drawing in which.

DETAILED DESCRIPTION

Figure 1:
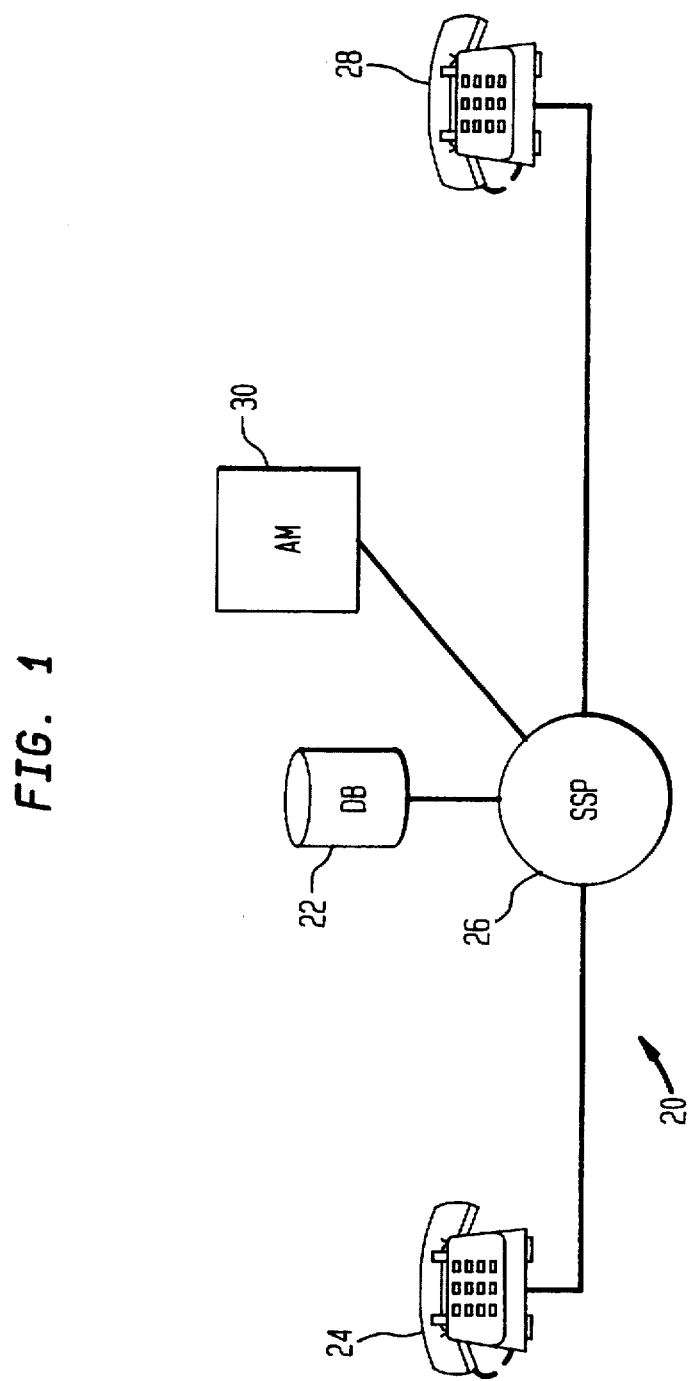
FIG. 1 is a schematic view of a network system according to a first embodiment of the invention.

A method and system for storing messages in a telephone network for later forwarding to one or more destinations or third parties according to the principles of the invention is described with reference to FIGS. 1–4. Referring to FIG. 1, the method and system for storing messages for later forwarding is preferably embodied in a switched telephone network 20 to provide an intelligent service. A database ("DB") 22 in the switched telephone network 20 stores messages (a) for later forwarding to one or more parties and/or (b) for being accessed by a party with appropriate authorization. Appropriate authorization of the party can be determined based on an entered personal identification number. An authorized party desiring access to the system is able to hear a stored message or add comments onto the stored message for subsequent forwarding to various parties.

When a telephone call is initiated by a calling party from an originating telephone station 24 toward a destination party telephone number 28, the telephone call is routed in the telephone network 20 and the status of the telephone call at the destination party telephone number 28 is monitored to determine a busy or unanswered condition at the destination party telephone number. Responsive to a busy or unanswered condition, the network database 22 is queried and message recording instructions for the calling party are retrieved from the network database 22.

The telephone call originating from the calling party telephone station 24 can include a call discriminator. The call discriminator can comprise a translatable telephone number such as an "800" toll-free number sequence with appropriate ANI or a cut-through code for allowing the call to be routed through a Local Exchange Carrier (LEC) into the switched telephone network 20. The switched telephone network 20 is able to determine that a call discriminator is present and is able to use the call discriminator to switch the telephone call through the LEC to a service switching point (SSP) 26 in order to query the database 22, which can include (a) message recording instructions, (b) subscriber telephone numbers, and/or (c) PIN verification information. The service switching point 26 includes system hardware and software, as well as an associated intelligent processor, which enables it to monitor the telephone call associated with the destination telephone number 28. The service switching point 26 queries the database 22, which can include a service control point (SCP), and retrieves message recording instructions for the calling party when the status of the telephone call is determined to be busy or unanswered.

Messages can be forwarded to one or more destination numbers at a specified date and time received from the calling (or other) party. The destination party may have to be authorized to receive stored messages. An announcement manager ("AM") 30 is operable to generate a request for the destination party to enter a personal identification number, such as through dual-tone multi-frequency (DTMF) signals. The database 22 can be queried by a network switch to determine if the destination party is authorized for accessing and retrieving messages. Once the destination party has received the message, he can add additional comments if authorized to do so.

Processing according to the principles of the invention comprises: (i) collecting information about the call and the destination party, (ii) processing collected information to determine if a message ought to be and can be recorded, and (iii) executing call processing instructions such as switching the recorded message or messages at a later time and date to the one or more destination or other parties.

Intelligent network elements can be used for implementing the invention. Intelligent network systems suitable for implementing the invention, in view of this disclosure, are well known in the art and are commercially available from AT&T Corp. ("AT&T") under the A-I-Net™ advanced intelligent network family of products. The intelligent network architecture provided according to the principles of the invention superimposes on an existing telecommunication system a modular configuration of network elements to enhance telecommunications services. The intelligent network elements could be owned or controlled either by a Local Exchange Carrier (LEC) or an Interexchange Carrier (IXC), or by both.

Figure 2:
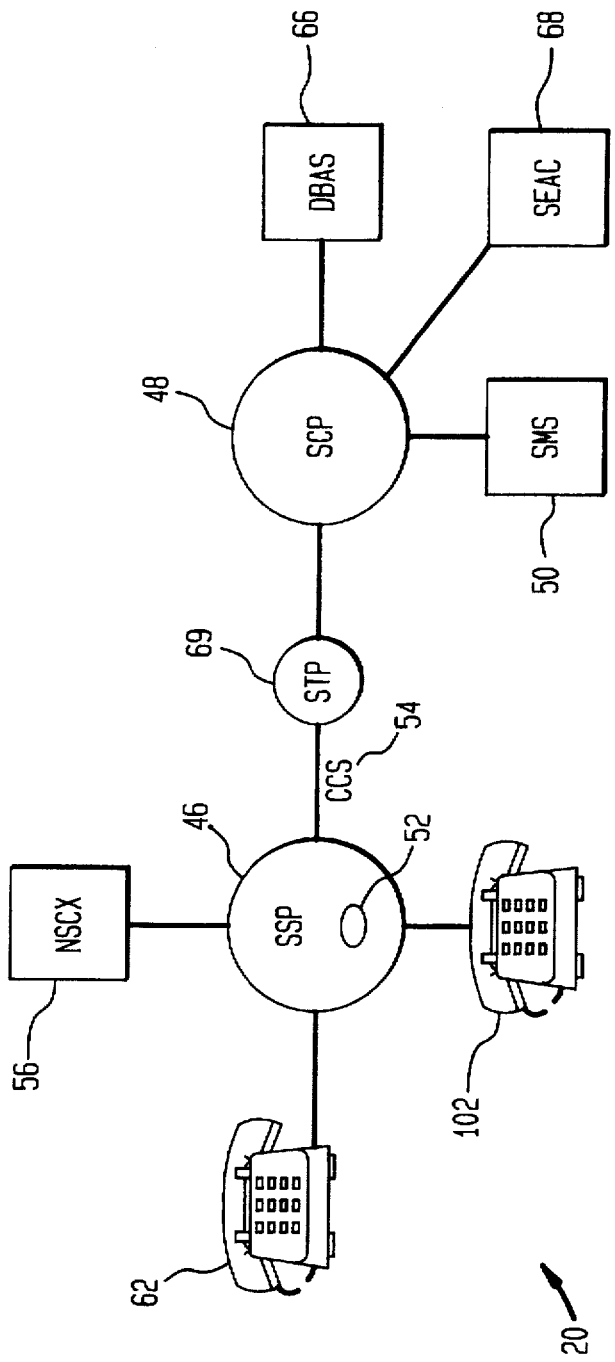
FIG. 2 is a schematic view of a network system according to a second embodiment of the invention.

In a second specific embodiment of the invention, depicted in FIG. 2, a switched telephone network 20 includes a service switching point (SSP) 46, a service control point (SCP) 48, and a service management system (SMS) 50. An intelligent processor 52 can be associated with the service switching point 46. The service switching point 46 is operable to (i) recognize service requirements and requests, (ii) request call routing and processing instructions from a service control point, and (iii) execute those instructions to complete a telephone call.

The service switching point 46 includes appropriate software and service logic for interfacing with the CCS7 signaling network such as through a datalink 54, and interacting through the signaling network datalink 54 with a service control point (SCP). The service switching point 46 allows intelligent network "triggering", i.e., detecting a condition that requires the SSP 46 to initiate operation of the intelligent network service by launching a query to the SCP 48. The SSP 46 formulates and transmits requests to the SCP 48 and processes replies and requests from the SCP 48. The processor 52 associated with the service switching point 46 in a specific embodiment of the invention supports speech recognition (identifying spoken words) and voice recognition (recognizing the voice of a particular speaker) capability so as to determine if a party who desires access to the messaging system to receive and affect messages has authorization to do so. The service switching point (SSP) 46 can, for example, be an AT&T 5ESS electronic switching system provisioned with AT&T's A-I-Net™ intelligent software to provide such functionality.

The SCP 48 creates and plays intelligent network announcements and can be operatively coupled to an announcement manager such as, for example, a Network Services Complex (NSCX) 56 for generating announcements via the service provider (e.g., a local exchange carrier or an interexchange carrier). The NSCX 56 is able to transmit messages and announcements to the service control point and also to the calling party or another party through the switched telephone network.

The service control point (SCP) 48 stores (a) call control instructions and call routing instructions for execution by the service switching point 46 as well as (b) message recording instructions, in accordance with the principles of the invention. The SCP 48 receives requests from an SSP 46 and determines message recording instructions, such as by activating the announcement manager through an NSCX facility and/or determines a destination telephone number for later forwarding and delivery of a message. The SCP 48 receives and processes event messages from the SSP 46 and formulates and sends responses to the SSP 46. The SCP 48, in accordance with the principles of the invention, can be an AT&T A-I-Net™ service control point. The SCP 48 interfaces with, and receives commands controlling services and service features, from a services management system (SMS) 50.

The services management system (SMS) 50 is a management and provisioning system that serves as an intelligent network service administration platform. The services management system 50 formulates and sends commands to the service control point 48 to control services and service features. The SMS 50 can be an AT&T A-I-Net™ Service Management System.

In an exemplary embodiment of the invention, the SCP 48 interfaces with the switched telephone network using a plurality of 56 kb/s SS7 links or 9.6 kb/s or 56 kb/s X.25 links, and interfaces with operations support systems such as the services management system (SMS) 50, a Data Base Administration System (DBAS) 66, and a Signal Engineering and Administration Center (SEAC) 68 using duplicated 9.6 kb/s BX.25 links. The SEAC 68 allows operational and administrative support for the signal transfer points (STPs) 69 making up the CCS7 network. The SEAC 68 contains routing information for use by STPs, such as 6-digit or NPA-XXX translations used by an STP to route a query to an SCP.

Figure 3:
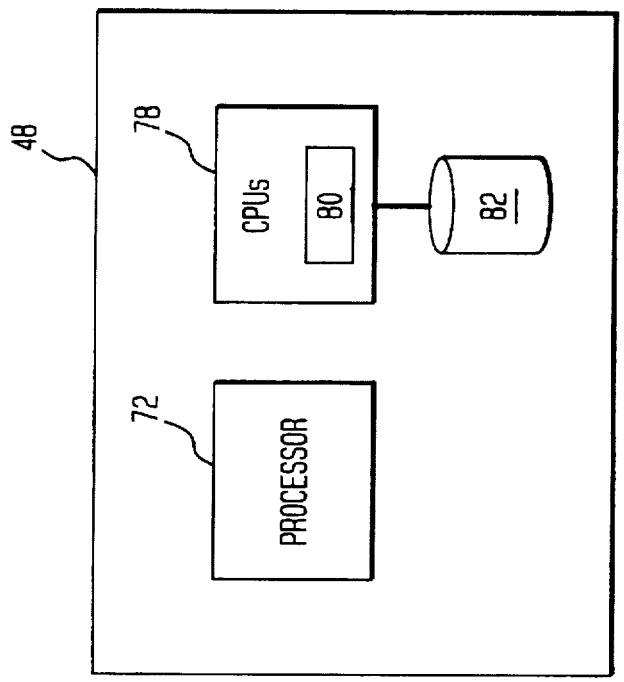
FIG. 3 is a schematic view of a service control point according to an embodiment of the invention.

A hardware architecture for a service control point (SCP) 48 is depicted in FIG. 3. The system contains a front-end processor 72 for SS7 protocol processing and uses a duel-ethernet configuration with central processor units (CPUs) 78 in the back end. The CPUs 78 perform the SS7 application layer protocol processing as well as the appropriate query processing. For some applications, the data required to handle queries is stored in CPU main memory 80, and for other applications the data reside in a disk subsystem 82.

Figure 4:
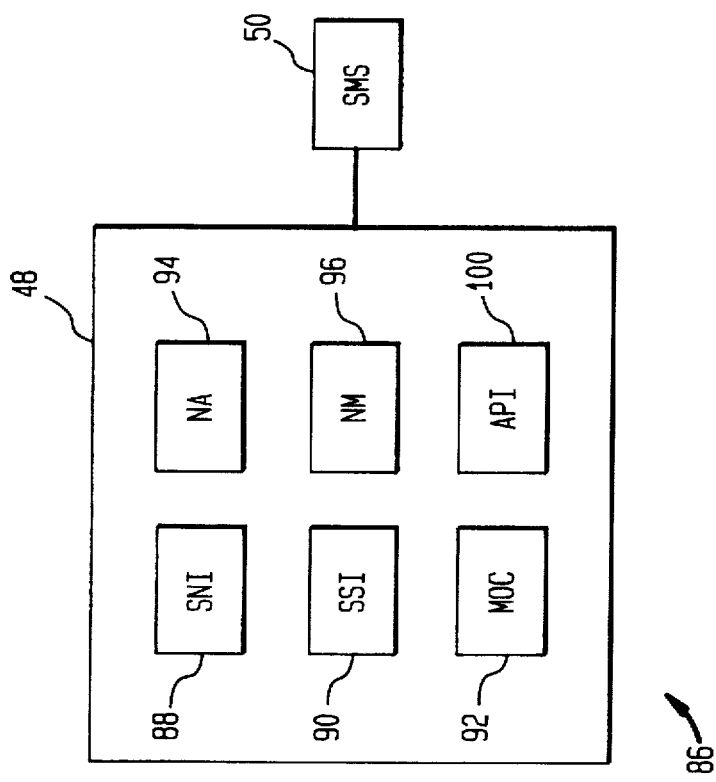
FIG. 4 is a schematic view of service control point software architecture according to an embodiment of the invention.

A software architecture for a service control point (SCP) 48, depicted in FIG. 4, includes six major subsystems. Three of the subsystems are interfaces. The Service Network Interface (SNI) 88 has System 7 protocol software, or the equivalent for the X.25 protocol. The Support System Interface (SSI) 90 contains BX.25 protocol software and link recovery software for the interface with the service management system. A Maintenance and Operations Console (MOC) 92 subsystem has a craftsperson interface with color graphics, windowing, and icons.

A Node Administration (NA) 94 subsystem contains administrative tables and measurements data. A Node Manager (NM) 96 has fault recovery and diagnostic software and is used for start-up and shutdown, and supports growth and retrofitting without service interruption. The Node Manager 96 can detect a problem with a process or data, and can accomplish an escalating sequence of recovery actions until the problem is cleared. Service application software is written to run on the SCP platform using an Application Programming Interface (API) 100.

In operation, a calling party initiates a telephone call from an originating telephone station 62 (FIG. 2) directed to a destination party at a destination telephone number 102. The telephone call is switched to a service switching point 46 in the switched telephone network 20. The service switching point 46 monitors the status of the telephone call to determine a busy or unanswered condition at the destination telephone number 102. If there is a busy or unanswered condition, the service switching point 46 launches a query to a network database, such as a service control point 48, so as to obtain message recording instructions for the calling party. In addition to formulating message recording instructions for the calling party, the service control point 48 launches a command to activate an announcement manager such as a network services complex (NSCX) 56 to play a message at a certain time in the telephone call. The message can, for example, include a "beep" generated by the announcement manager and service control point. The message recording instructions can include how to record a message, such as after the "beep", and how to enter a date and time at which the recorded message is to be forwarded to a destination telephone number 102. This date and time information can be entered through a dual-tone multi-frequency (DTMF) sequence in response to a set of instructions.

At the selected date and time, the message forwarding system in the switched telephone network 20 forwards the message simultaneously to one or more telephone numbers corresponding to the destination party 102 and/or to other parties. To receive a forwarded message, a destination party may be required to enter a PIN or other identifier to obtain access to the stored message. In that case and responsive to a verified PIN, a query is launched by the SSP 46 to the SCP 48, in which the message is stored, in order to retrieve the message.

An authorized party has the option of modifying the stored message by adding a comment to the message. The authorized party, such as the destination party, can record the comment to be added onto the message and forward the message with the added comment to one or more parties through an entered dual-tone multi-frequency (DTMF) sequence.

It is also contemplated that an announcement could be played to a caller or destination party to collect a voice print from the caller or destination party and that an intelligent processor could be used to analyze the voice print to determine message recording instructions and/or call forwarding instructions based on the voice print.

While several particular forms of the invention have been illustrated and described, it will also be apparent that various modifications can be made without departing from the spirit and scope of the invention.

We claim:

1. A method for storing messages from a calling party in a telephone switching network for later forwarding, comprising the following steps:

(A) monitoring a telephone call to determine a busy or unanswered condition at a destination party telephone number;

(B) switching the telephone call being routed to the destination party telephone number to a service switching point;
 receiving at a service control point queries launched from the service switching point to determine authorization to access a network database;

(C) querying the network database, which is in the service switching point, to retrieve message recording instructions for the calling party;

(D) recording a message from the calling party within the network database;

(E) retrieving the message by the destination party at a later time, adding a comment to the message, and recording the message and added comment in the network database; and (F) after recording the message and added comment in the network database, forwarding the message and added comment to at least one third party at a date and time selected by the destination party.

2. A method according to claim 1, further comprising the step of:
 forwarding the message and added comment to a plurality of parties.

3. A method according to claim 1, further comprising the steps of:
 querying the network database to determine if the at least one third party is a subscriber to a messaging system for receiving recorded messages; and
 forwarding a message to the at least one third party only if the at least one third party is a subscriber to the messaging system.

4. A method according to claim 1, further comprising the step of:
 dialing a translatable telephone number to receive the message.

5. A method for storing messages from a calling party in a telephone switching network for later forwarding, comprising the following steps:

(A) monitoring a telephone call to determine a busy or unanswered condition at a destination party telephone number;

(B) switching the telephone call being routed to the destination party telephone number to a service switching point;
 receiving at a service control point queries launched form the service switching point to determine authorization to access a network database;

(C) querying the network database, which is in the service switching point, to retrieve message recording instructions for the calling party;

(D) recording a message from the calling party within the network database; and (E) after recording the message within the network database, collecting a personal identification number from the destination party,
 querying the network database in response to receiving the personal identification number to determine if the destination party is a subscriber to a messaging system for receiving recorded messages, and
 forwarding the message to the destination party telephone number at a later date and time specified by the calling party only if the destination party is a subscriber to the messaging system.

6. A method according to claim 5, further comprising the step of:

determining message recording instructions for the calling party.

7. A method according to claim 5, further comprising the step of:

determining forwarding instructions from the calling party for forwarding the message.

8. A method according to claim 5, further comprising the steps of:

playing an announcement to the calling party;

determining forwarding instructions; and forwarding the message to the destination party telephone number based on the forwarding instructions.

9. A method according to claim 5, further comprising the step of:

dialing a translatable telephone number to receive the message.

10. A system for storing a message from a calling party in a switched telephone network and forwarding the message to a destination party telephone number, comprising:

a switch for receiving a telephone call in the switched telephone network and monitoring the telephone call to determine a busy or unanswered condition at the destination party telephone number;

database means within the switch for (i) storing message recording instructions for the calling party, and (ii) storing one or more messages recorded by the calling party;

means for querying the database means to obtain message recording instructions;

means for determining authorization of the destination party to access the database means;

means for storing added comments from the destination party onto a particular one of the one or more messages after determining authorization; and means for forwarding the messages after storing the messages in the database means to the destination party telephone number at a later date and time specified by the calling party; and further comprising:

a service switching point for receiving a telephone call from the switch; and a service control point for receiving queries launched from the service switching point to determine authorization of the calling party to access the database means.

11. A system according to claim 10, further comprising:

a service management system for updating the message recording instructions.

12. A system according to claim 10, further comprising:

an announcement manager within the telephone network for playing an announcement to the destination party requesting a personal identification number; and means within the telephone network for receiving the personal identification number and approving the destination party based on the personal identification number.

13. A system according to claim 10, further comprising:

an announcement manager for generating announcements to the calling party.

\* \* \* \* \*